(12) United States Patent
Wang et al.

(10) Patent No.: US 10,876,847 B2
(45) Date of Patent: Dec. 29, 2020

(54) SYSTEMS AND METHODS FOR ROUTE PLANNING

(71) Applicant: BEIJING DIDI INFINITY TECHNOLOGY AND DEVELOPMENT CO., LTD., Beijing (CN)

(72) Inventors: Zheng Wang, Beijing (CN); Ziteng Wang, Beijing (CN); Xiaowei Zhong, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 33 days.

(21) Appl. No.: 16/212,633

(22) Filed: Dec. 6, 2018

(65) Prior Publication Data

US 2019/0107405 A1 Apr. 11, 2019

Related U.S. Application Data

(63) Continuation of application No. PCT/CN2017/082176, filed on Apr. 27, 2017.

(51) Int. Cl.
*G01C 21/34* (2006.01)
*G01C 21/20* (2006.01)
*G06N 3/04* (2006.01)
*G06N 3/08* (2006.01)

(52) U.S. Cl.
CPC ......... *G01C 21/3446* (2013.01); *G01C 21/20* (2013.01); *G06N 3/0454* (2013.01); *G06N 3/088* (2013.01)

(58) Field of Classification Search
CPC .. G01C 21/3446; G01C 21/20; G06N 3/0454; G06N 3/088
See application file for complete search history.

(56) References Cited

U.S. PATENT DOCUMENTS

2011/0310867 A1 12/2011 Kennedy et al.
2013/0116882 A1 5/2013 Link, II et al.
(Continued)

FOREIGN PATENT DOCUMENTS

| CN | 105043400 A | 11/2015 |
|---|---|---|
| CN | 106296692 A | 1/2017 |
| EP | 2369299 A1 | 9/2011 |

OTHER PUBLICATIONS

Agustinus Kristiadi, Generative Adversarial Nets in TensorFlow, Sep. 17, 2016 (Year: 2016).*
International Search Report in PCT/CN2017/082176 dated Jan. 30, 2018, 4 pages.
Written Opinion in PCT/CN2017/082176 dated Jan. 30, 2018, 4 pages.

(Continued)

*Primary Examiner* — Hunter B Lonsberry
*Assistant Examiner* — Elizabeth Yang
(74) *Attorney, Agent, or Firm* — Metis IP LLC

(57) ABSTRACT

The present disclosure relates to systems and methods for recommending a route for a request. The system may perform the methods to receive a request from a terminal, wherein the request may include a departure location and a destination; determine a Generative Adversarial Network (GAN) model; determine at least one recommended route that travels from the departure location to the destination based on the GAN model; and transmit the at least one recommended route to be displayed on the terminal in response to the request.

21 Claims, 8 Drawing Sheets

(56) References Cited

U.S. PATENT DOCUMENTS

| | | | |
|---|---|---|---|
| 2015/0066355 A1 | 3/2015 | Siegel et al. | |
| 2015/0134244 A1 | 5/2015 | Hershey et al. | |
| 2015/0345968 A1 | 12/2015 | Wang | |
| 2016/0047667 A1* | 2/2016 | Kantarjiev | G08G 1/0129 |
| | | | 701/533 |
| 2016/0078339 A1* | 3/2016 | Li | G06N 3/084 |
| | | | 706/20 |
| 2016/0202079 A1 | 7/2016 | Konig et al. | |
| 2016/0325753 A1* | 11/2016 | Stein | B60W 40/06 |
| 2017/0031920 A1 | 2/2017 | Manning et al. | |
| 2018/0189215 A1* | 7/2018 | Boesch | G06F 30/34 |
| 2019/0228571 A1* | 7/2019 | Atsmon | G06T 19/006 |

OTHER PUBLICATIONS

Emily Denton et al., Deep Generative Image Models using a Laplacian Pyramid of Adversarial Networks, Advances in neural information processing systems, 2015.

Mehdi Mohammadi et al., Path Planning in Support of Smart Mobility Applications Using Generative Adversarial Networks, IEEE SmartData—2016 Conference, 2018, 8 pages.

Noriaki Hirose et al., To Go or Not to Go? A Near Unsupervised Learning Approach for Robot Navigation, 2017, 8 pages.

Extended European Search Report in European Application No. 17806924.0 dated Jul. 19, 2019, 6 pages.

Goodfellow, I. J. et al., Generative Adversarial Networks. Advances in Neural Information Processing Systems, 2014, 10 pages.

The Third Examination Report in Australian Application No. 2017411198 dated Aug. 26, 2020, 5 pages.

\* cited by examiner

SYSTEMS AND METHODS FOR ROUTE PLANNING

CROSS-REFERENCE TO RELATED APPLICATIONS

This application claims priority to International Application No. PCT/CN2017/082176, filed on Apr. 27, 2017, designating the United States of America, the contents of which are incorporated herein by reference.

TECHNICAL FIELD

The present disclosure generally relates to systems and methods for on-demand service, and in particular, systems and methods for recommending a route based on a Generative Adversarial Network (GAN) model.

BACKGROUND

Internet based route planning has become increasingly popular because of its convenience. A system providing route planning service may obtain a departure location and a destination from a driver and recommend a route that travels from the departure location to the destination for the driver. When the system recommending the route, the system may analyze traffic condition, distance information, time information, etc. However, the recommended route may not meet the driver's requirements due to various real-time situations. As a result, the driver may have to deviate from the recommended route.

SUMMARY

According to an aspect of the present disclosure, a system is provided. The system may include at least one storage medium and at least one processor configured to communicate with the at least one storage medium. The at least one storage medium may include a set of instructions for recommending at least one route associated with a request. When the at least one processor executes the set of instructions, the at least one processor may be directed to perform one or more of the following operations. The at least one processor may receive a request form a terminal, wherein the request may include a departure location and a destination. The at least one processor may determine a Generative Adversarial Network (GAN) model. The at least one processor may determine at least one recommended route that travels from the departure location to the destination based on the GAN model. The at least one processor may transmit the at least one recommended route to be displayed on the terminal in response to the request.

In some embodiments, the at least one processor may obtain a set of sample routes. The at least one processor may generate a generative model. The at least one processor may determine a set of estimated routes based on the generative model. The at least one processor may generate a discriminative model. The at least one processor may determine a first loss function of the discriminative model based on the set of sample routes and the set of the estimated routes. The at least one processor may determine whether the value of the first loss function is less than a first threshold. The at least one processor may store the discriminative model based on the determination that the value of the first loss function is less than the first threshold.

In some embodiments, the at least one processor may update the discriminative model based on the determination that the value of the first loss function is not less than the first threshold.

In some embodiments, the at least one processor may determine a second loss function of the generative model based on the set of sample routes and the set of estimated routes. The at least one processor may determine whether the value of the second loss function is less than a second threshold. The at least one processor may store the generative model based on the determination that the value of the second loss function is less than the second threshold.

In some embodiments, the at least one processor may update the generative model based on the determination that the value of the second loss function is not less than the second threshold.

In some embodiments, the at least one processor may determine the GAN model based on the discriminative model and the generative model.

In some embodiments, each of the set of sample routes may include at least one of a sample departure location, a sample destination, link information between the sample departure location and the sample destination, a sample departure time, a sample arrival time, or traffic information associated with the each of the set of sample routes.

In some embodiments, the generative model may include a Convolutional Neural Network model, a Recurrent Neural Network model, etc.

In some embodiments, the discriminative model may include a Convolutional Neural Network model, a Recurrent Neural Network model etc.

In some embodiments, the number of the set of sample routes may be 256, 512, 1024, etc.

According to another aspect of the present disclosure, a method is provided. The method may include one or more of the following operations. A processor may obtain a request. The processor may receive the request from a terminal, wherein the request may include a departure location and a destination. The processor may determine a Generative Adversarial Network (GAN) model. The processor may determine at least one recommended route that travels from the departure location to the destination based on the GAN model. The processor may transmit the at least one recommended route to be displayed on the terminal in response to the request.

In some embodiments, the processor may obtain a set of sample routes. The processor may generate a generative model. The processor may determine a set of estimated routes based on the generative model. The processor may generate a discriminative model. The processor may determine a first loss function of the discriminative model based on the set of sample routes and the set of estimated routes. The processor may determine whether the value of the first loss function is less than a first threshold. The processor may store the discriminative model based on the determination that the value of the first loss function is less than the first threshold.

In some embodiments, the processor may update the discriminative model based on the determination that the value of the first loss function is not less than the first threshold.

In some embodiments, the processor may determine a second loss function of the generative model based on the set of sample routes and the set of estimated routes. The processor may determine whether the value of the second loss function is less than a second threshold. The processor may store the generative model based on the determination that the value of the second loss function is less than the second threshold.

In some embodiments, the processor may update the generative model based on the determination that the value of the second loss function is not less than the second threshold.

In some embodiments, the processor may determine the GAN model based on the discriminative model and the generative model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
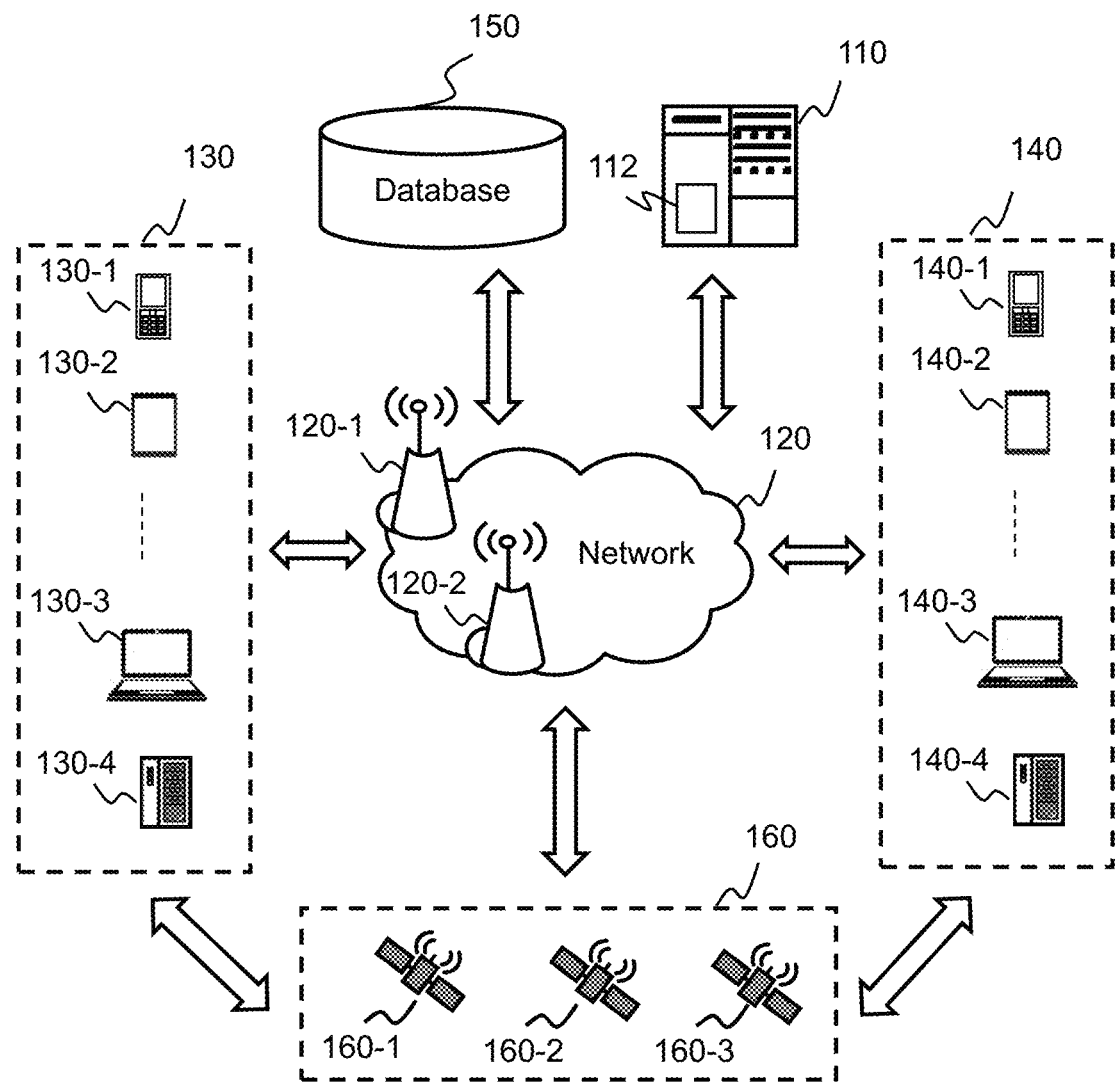
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding an on-demand transportation service, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The terms "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The terms "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure provides online systems and methods for recommending a route in response to a request. The systems and methods may receive a request including a departure location and a destination from a terminal. The systems and methods may determine a recommended route that travels from the departure location to the destination in response to the request based on a Generative Adversarial Network (GAN) model. The systems and methods may further transmit the recommended route to be displayed on the terminal. The systems and methods according to the present disclosure may also train the GAN model based on a plurality of sample routes associated with a plurality of historical orders. Accordingly, the present disclosure improves the efficiency and practicality of route planning.

It should be noted that route planning, overall, is a technology deeply rooted in Internet world. Recommending a route for a request including a departure location and a destination is not possible without the possibility of real-time GPS positioning and real-time communication between a terminal and a server. Also, recommending a route needs real-time traffic status information. Therefore, the technical solution disclosed in the present disclosure is also a technology deeply rooted in Internet era.

For an application scenario of the platform, the application scenario may include user terminals (e.g., a requestor terminal or a provider terminal) and vehicles (e.g., a taxi). When the user terminals make a service request, the platform may obtain location information (e.g., departure location, destination, etc.) and/or reference information (e.g., traffic information). For example, when a user hails a taxi, the platform may obtain location information of the user, recommend a route based on the location information, and provide the recommended route to the taxi driver and the user.

FIG. 1 is a schematic diagram illustrating an exemplary on-demand service system 100 according to some embodiments of the present disclosure. For example, the on-demand service system 100 may be an online transportation service platform for transportation services such as taxi hailing, chauffeur services, delivery vehicles, carpool, bus service, driver hiring and shuttle services. The on-demand service system 100 may be an online platform including a server 110, a network 120, a requestor terminal 130, a provider terminal 140, a database 150, and a positioning system 160. The server 110 may include a processing engine 112.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a recommended route that travels from a departure location to a destination in response to a request obtained from the requestor terminal 130. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the on-demand service system 100 (e.g., the server 110, the requestor terminal 130, the provider terminal 140, the database 150, and the positioning system 160) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components of the on-demand service system 100 (e.g., the server 110, the requestor terminal 130, the provider terminal 140). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140). In some embodiments, the database 150 may be part of the server 110.

The positioning system 160 may determine information associated with an object, for example, one or more of the requestor terminal 130, the provider terminal 140, etc. The information may include a location, an elevation, a velocity, or an acceleration of the object, or a current time. For example, the positioning system 160 may determine a current location of the requestor terminal 130. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the information mentioned above to the network 120, the requestor terminal 130, or the provider terminal 140 via wireless connections.

In some embodiments, one or more components of the on-demand service system 100 (e.g., the server 110, the requestor terminal 130, the provider terminal 140) may have permission to access the database 150. In some embodiments, one or more components of the on-demand service system 100 may read and/or modify information relating to the requestor, provider, and/or the public when one or more conditions are met. For example, the server 110 may read and/or modify one or more users' information after a service is completed. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

It should be noted that the application scenario illustrated in FIG. 1 is only provided for illustration purposes, and not intended to limit the scope of the present disclosure. For example, the on-demand service system 100 may be used as a navigation system. The navigation system may include a user terminal (e.g., the requestor terminal 130 or the provider terminal 140) and a server (e.g., the server 110). A user may input a departure location and a destination via the user terminal. The navigation system may accordingly recommend a route that travels from the departure location to the destination based on the process and/or method described in this disclosure and provide the recommended route to the user terminal to be displayed.

Figure 2:
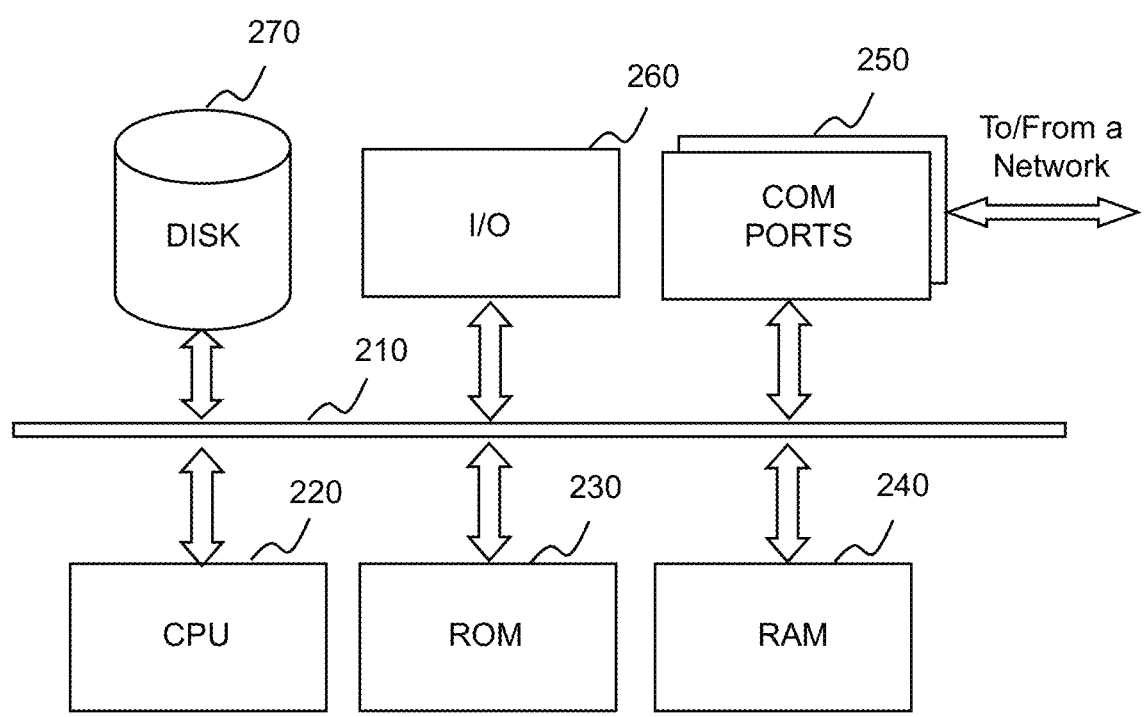
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service system as described herein. For example, the processing engine 112 may be implemented on the computing device, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and/or from a network connected thereto to facilitate data communications. The computing device 200 may also include a central processing unit (CPU) 220, in the form of one or more processors, for executing program instructions. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the CPU 220. The method and/or process of the present disclosure may be implemented as the program instructions. The computer device 200 also includes an I/O component 260, supporting input/output between the computer and other components. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
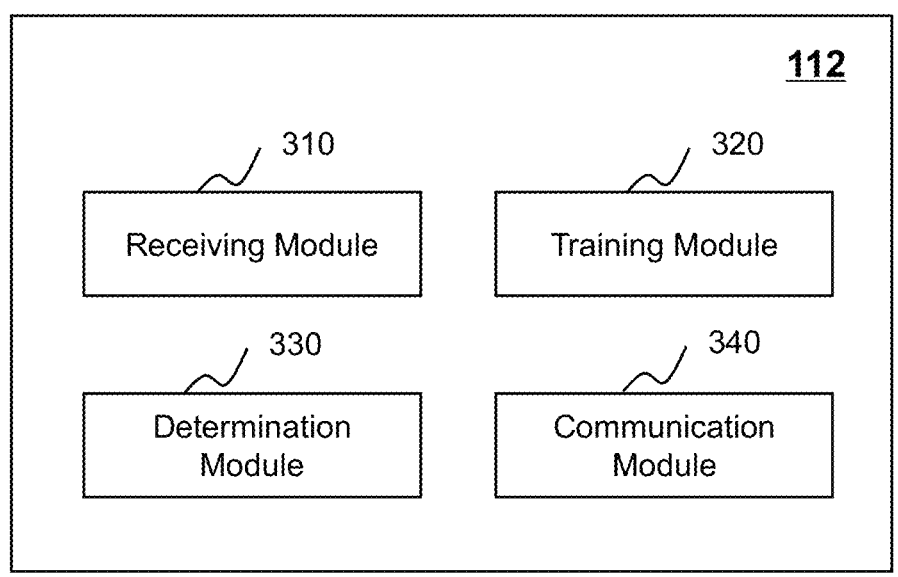
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include a receiving module 310, a training module 320, a determination module 330, and a communication module 340.

The receiving module 310 may be configured to receive a request. The receiving module 310 may receive the request from the requestor terminal 130 via the network 120. The request may include a departure location, a destination, a departure time, etc. In some embodiments, the receiving module 310 may further obtain reference information associated with request. The reference information may include traffic information associated with the request, weather information associated with the request, etc. In some embodiments, the received information (e.g., the request, the reference information, etc.) may be transmitted to other modules (e.g., the determination module 330) to be further processed.

The training module 320 may be configured to train a model for route planning. The model may be a Generative Adversarial Network (GAN) model. The GAN model may include a discriminative model and a generative model. The training module 320 may train the GAN model based on a plurality of sample routes (e.g., a plurality of sample routes associated with a plurality of historical orders). In some embodiments, the trained model may be transmitted to the determination module 330. In some embodiments, the trained model may be transmitted to a storage device (e.g., the database 150, a storage module (not shown) integrated in the processing engine 112) disclosed elsewhere in the present disclosure to be stored.

In some embodiments, the plurality of historical orders may be selected based on a temporal criteria. For example, the plurality of historical orders may be selected within a time period, i.e., the past six months, the past week, from 8:00 am to 9:00 am every day for six months, etc. In some other embodiments, the plurality of historical orders may be selected based on a spatial criteria. For example, the plurality of historical orders may be selected within one area, i.e., in Washington D.C. area, a three-mile radius area centered at the Capital Hill, etc. In yet other embodiments, the plurality of historical orders may be selected with respect to one or more parameters, for example, the vehicle type, the destination, the passenger profile, the driver profile, the service charge, etc.

The determination module 330 may be configured to determine a recommended route in response to the request based on the GAN model. The determination module 330 may obtain the request from the receiving module 310 and obtain the GAN model from the training module 320. The determination module 330 may transmit the recommended route to the communication module 340.

The communication module 340 may be configured to transmit the recommended route to the requestor terminal 130 and/or the provider terminal 140. The recommended route may be displayed on the requestor terminal 130 and/or the provider terminal 140. In some embodiments, the recommended route may be presented on the requestor terminal 130 and/or the provider terminal 140 in a format of text, images, video content, audio content, graphics, or the like, or a combination thereof.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the receiving module 310 may be integrated into the determination module 330 as a single module which may both obtain the request and determine the recommended route. As another example, the processing engine 112 may include a storage module (not shown in FIG. 3) which may be configured to store the request, the trained model, the recommended route, and/or any information associated with the request.

Figure 4:
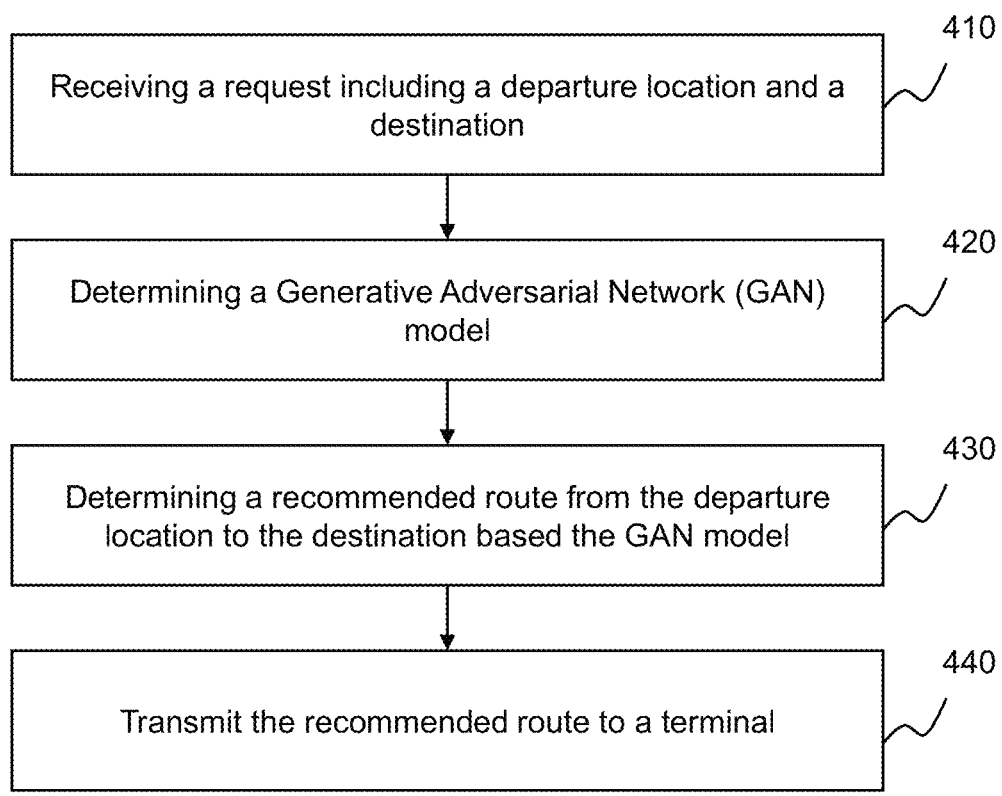
FIG. 4 is a flowchart illustrating an exemplary process/method for determining a recommended route according to some embodiments of the present disclosure.

FIG. 4 is a flowchart of an exemplary process/method 400 for determining a recommended route according to some embodiments of the present disclosure. The process and/or method 400 may be executed by the on-demand service system 100. For example, the process and/or method 400 may be implemented as a set of instructions (e.g., an application) stored in the storage ROM 230 or RAM 240. The CPU 220 may execute the set of instructions and may accordingly be directed to perform the process and/or method 400. The operations of the illustrated process/method presented below are intended to be illustrative. In some embodiments, the process/method may be accomplished with one or more additional operations not described, and/or without one or more of the operations discussed. Additionally, the order in which the operations of the process/method as illustrated in FIG. 4 and described below is not intended to be limiting.

In step 410, the processing engine 112 may receive a request. The processing engine 112 may receive the request from the requestor terminal 130 via the network 120. The request may include a departure location, a destination, a departure time (e.g., the present moment, an appointment time, etc.), etc.

In step 420, the processing engine 112 may determine a GAN model. As used herein, the GAN model may be used to generate a route in response to the request. The GAN model may include a discriminative model and a generative model. The processing engine 112 may determine the GAN model by training a preliminary GAN model including a preliminary generative model and a preliminary discriminative model based on historical information. For example, the processing engine 112 may train the preliminary generative model and the preliminary discriminative model based on a plurality of sample routes associated with a plurality of historical orders. As used herein, the term "a historical order" generally refers to a request that has been completed and the information associated therein. For example, for the application scenario illustrated in FIG. 1, a requestor may send a request including a departure location and a destination for a transportation service to the on-demand service system 100. A service provider may accept the request and provide the transportation service along a route that travels from the departure location to the destination. After the service provider drops off the requestor at the destination, the on-demand service system 100 may store the route in a storage device disclosed elsewhere in the present disclosure. In step 420 in which the GAN model may be trained, the route may be used as a sample route.

In step 430, the processing engine 112 may determine a recommended route that travels from the departure location to the destination based the GAN model.

In step 440, the processing engine 112 may transmit the recommended route to be displayed on the requestor terminal 130 and/or the provider terminal 140. The recommended route may be presented on the requestor terminal 130 and/or the provider terminal via one or more user interfaces (not shown). In some embodiments, the recommended route may be transmitted and/or received via a message using any suitable communication protocol (e.g., the Hypertext Transfer Protocol (HTTP), Address Resolution Protocol (ARP), Dynamic Host Configuration Protocol (DHCP), File Transfer Protocol (FTP), etc.).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 400.

Figure 5:
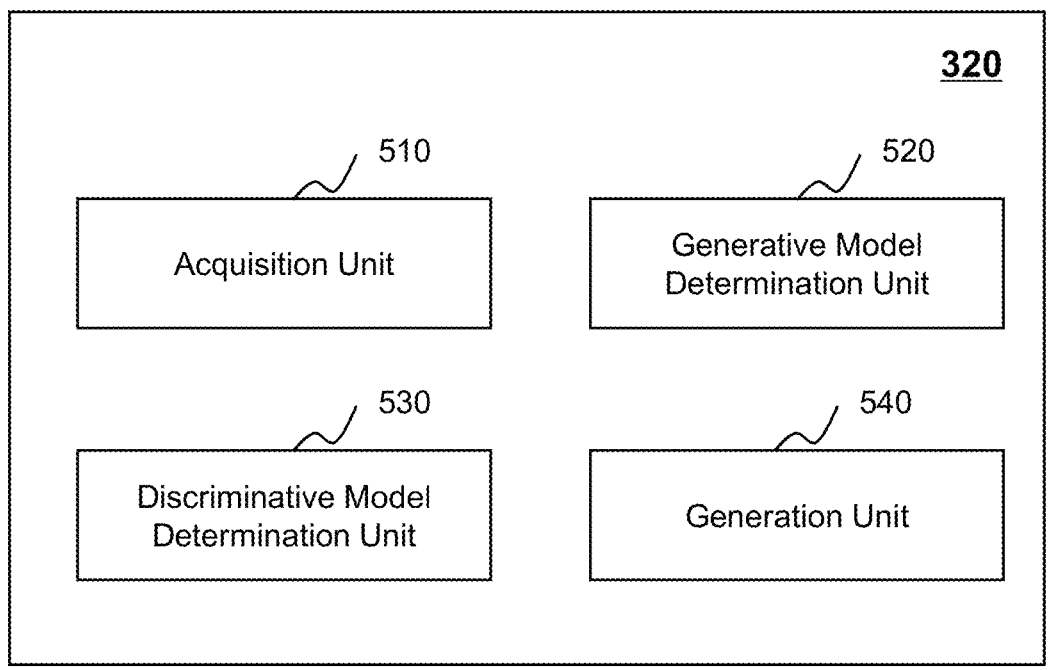
FIG. 5 is a block diagram illustrating an exemplary training module according to some embodiments of the present disclosure.

FIG. 5 is a block diagram illustrating an exemplary training module 320 according to some embodiments of the present disclosure. The training module 320 may include an acquisition unit 510, a generative model determination unit 520, a discriminative model determination unit 530, and a generation unit 540.

The acquisition unit 510 may be configured to acquire a set of sample routes. The acquisition unit 510 may acquire the set of sample routes from a storage device (e.g., the database 150, a storage module (not shown) integrated in the processing engine 112, etc.) disclosed elsewhere in the present disclosure. As used herein, the set of sample routes may be a set of sample routes associated with a plurality of historical orders within a specific time period (e.g., the past one month).

The generative model determination unit 520 may be configured to determine a generative model. The generative model determination unit 520 may determine the generative model by training a preliminary generative model. The preliminary generative model may be default settings of the on-demand service system 100, or may be adjustable under different situations. The preliminary generative model may include a plurality of generative parameters. The generative model determination unit 520 may iteratively modify the plurality of generative parameters until the plurality of modified generative parameters satisfies a preset condition. During each iteration, the generative model determination unit 520 may generate a set of estimated routes based on the preliminary/updated generative model. The generative model determination unit 520 may transmit the set of estimated routes to the discriminative model determination unit 530 to be discriminated. Further, the generative model determination unit 520 may modify the plurality of generative parameters based on the discriminative result.

The discriminative model determination unit 530 may be configured to determine a discriminative model. The discriminative model determination 530 may determine the discriminative model by training a preliminary discriminative model. The preliminary discriminative model may be default settings of the on-demand service system 100, or may be adjustable under different situations. The preliminary discriminative model may include a plurality of discriminative parameters. The discriminative module determination unit 530 may iteratively modify the plurality of discriminative parameters based on the set of sample routes and the set of estimated routes until the plurality of modified discriminative parameters satisfies a preset condition.

The generation unit 540 may be configured to generate a GAN model based on the generative model and the discriminative model. The generated GAN model may be stored in any storage device (e.g., the database 150, a storage module (not shown) integrated in the processing engine 112, etc.) disclosed elsewhere in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the training module 320 may include a storage unit (not shown) used to store any information associated with the generative model and the discriminative model. As another example, the units in the training module 320 may include a storage sun-unit (not shown) respectively. As a further example, the generative model determination unit 520 and the discriminative model determination unit 530 may be integrated as a single module which may both determine the generative model and the discriminative model.

Figure 6:
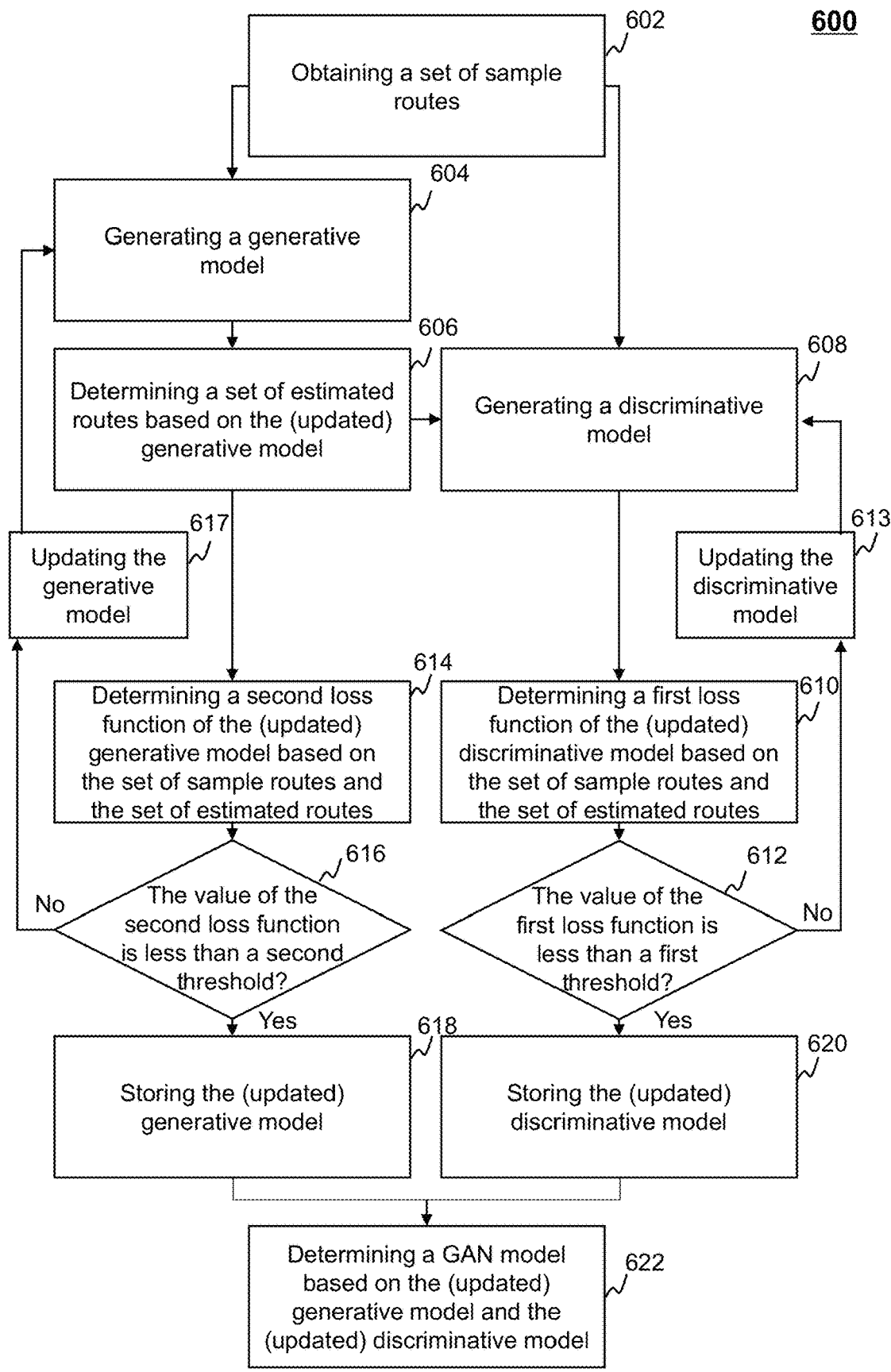
FIG. 6 is a flowchart illustrating an exemplary process/method for determining a Generative Adversarial Network (GAN) model according to some embodiments of the present disclosure.

FIG. 6 is a flowchart illustrating an exemplary process/method 600 for determining a GAN model according to some embodiments of the present disclosure. The process and/or method 600 may be executed by the on-demand service system 100. For example, the process and/or method 600 may be implemented as a set of instructions (e.g., an application) stored in the storage ROM 230 or RAM 240. The CPU 220 may execute the set of instructions and may accordingly be directed to perform the process and/or method 600. The operations of the illustrated process/method presented below are intended to be illustrative. In some embodiments, the process/method may be accomplished with one or more additional operations not described, and/or without one or more of the operations discussed. Additionally, the order in which the operations of the process/method as illustrated in FIG. 6 and described below is not intended to be limiting.

In step 602, the processing engine 112 may obtain a set of sample routes. The processing engine 112 may obtain the set of sample routes from a storage device (e.g., the database 150, a storage module (not shown) integrated in the processing engine 112, etc.) disclosed elsewhere in the present disclosure. The number of the set of sample routes may be default settings of the on-demand service system 100 (e.g., 256, 512, 1024, etc.), or may be adjustable under different situations. The set of sample routes may be a set of sample routes associated with a plurality of historical orders.

In some embodiments, each of the set of sample routes may include a sample departure location, a sample destination, link information between the sample departure location and the sample destination, a sample departure time, a sample arrival time, traffic information associated with the sample route, etc.

The link information may refer to information associated with a plurality of links (i.e., a section of a road or a street) in the sample route between the sample departure location and the sample destination. For example, the link information may include the number of the plurality of links, distances of the plurality of links, etc.

The traffic information may include traffic status information, traffic light information, grade information (e.g., a grade of a road or a street) of the plurality of links, etc. The traffic status information may include traffic speed, traffic flow, traffic density, etc. The traffic light information may include a distribution of traffic lights, the number of the traffic lights, etc. In some embodiments, the grade of a road or a street may be classified as five grades according to speed limits, such as expressway, first-class highway, second-class highway, third-class highway, and forth-class highway. In some embodiments, the grade of a road or street may be classified as four grades according to geographic information, such as national highway, provincial road, county road, and village road.

In step 604, the processing engine 112 may generate a generative model. It should be noted that the process/method 600 may be an iterative process including one or more iterations. In a first iteration, the processing engine 112 may generate a preliminary generative model. The preliminary generative model may include a Convolutional Neural Network (CNN) model, a Recurrent Neural Network (RNN) model, etc. The preliminary generative model may be default settings of the on-demand service system 100, or may be adjustable under different situations. The preliminary generative model may include one or more preliminary generative parameters.

In step 606, the processing engine 112 may determine a set of estimated routes based on the preliminary generative model and the set of sample routes. The number of the set of estimated routes may be the same as that of the set of sample routes. For example, for a specific sample route including a specific sample departure location and a specific sample destination, the processing engine 112 may accordingly determine an estimated route from the specific sample departure location to the specific sample destination. The processing engine 112 may apply traffic information (e.g., traffic status information, traffic light information, etc.) as one parameter to determine the estimated route.

In step 608, the processing engine 112 may generate a discriminative model. The discriminative model may be used to determine an average probability value of the set of estimated routes, which indicates how much the set of estimated routes is close to the set of sample routes. As used herein, the probability value is within a range between 0 and 1. As described in connection with step 602, in the first iteration, the processing engine 112 may generate a preliminary discriminative model. The preliminary discriminative model may include a CNN model, a RNN model, etc. The preliminary discriminative model may be default settings of the on-demand service system 100, or may be adjustable under different situations. The preliminary generative model may include one or more preliminary discriminative parameters.

In step 610, the processing engine 112 may determine a first loss function of the preliminary discriminative model based on the set of sample routes and the set of estimated routes.

For example, the processing engine 112 may determine the first loss function of the discriminative model according to formula (1) shown below:

$$J^{(D)}(\theta^{(D)},\theta^{(G)}) = -\tfrac{1}{2} E_{x \sim p_{data}} \log D(x) - \tfrac{1}{2} E_z \log(1-D(G(z))), \quad (1)$$

where $J^{(D)}$ may represent the first loss function of the discriminative model (in the first iteration, it represents the first loss function of the preliminary discriminative model, similarly hereinafter); $\theta^{(D)}$ may represent the discriminative parameter(s) of the discriminative model; $\theta^{(G)}$ may represent the generative parameter(s) of the generative model; x may represent the set of the sample routes; D(x) may represent an average probability value of the set of sample routes determined based on the discriminative model; $x \sim p_{data}$ may be a distribution of the set of sample routes; z may represent input information (e.g., a sample departure location, a sample destination, traffic information, etc.) of the generative model; G(z) may represent the set of estimated routes; D(G(z)) may represent an average probability value of the set of estimated routes determined based on the discriminative model; $E_{x \sim p_{data}}$ may represent an average expectation value of the set of sample routes (by default, the expectation value of the sample route approximates to "1"); and $E_z$ may represent an average expectation value of the set of estimated routes (by default, the expectation value of the estimated route approximates to "0").

In step 612, the processing engine 112 may determine whether the value of the first loss function is less than a first threshold. The first threshold may be default settings (e.g., 0.5) of the on-demand service system 100, or may be adjustable under different situations.

In response to the determination that the value of the first loss function is less than the first threshold, the processing engine 112 may execute the process/method 600 to step 620 to store the preliminary discriminative model.

In response to the determination that the first loss function is greater than or equal to the first threshold, the processing engine 112 may execute the process/method 600 to step 613. In step 613, the processing engine 112 may update the preliminary discriminative model. For example, the processing engine 112 may update the one or more discriminative parameters of the preliminary discriminative model. After the processing engine 112 updates the preliminary discriminative model, the processing engine 112 may execute the process/method to return back to step 608 to determine an updated discriminative model and start a new iteration until the value of the first loss function is less than the first threshold.

Referring back to step 606, after the processing engine 112 determines the set of estimated routes based on the preliminary generative model, the processing engine 112 may execute the process/method to step 614. In step 614, the processing engine 112 may determine a second loss function of the preliminary generative model based on the set of sample routes and the set of estimated routes.

For example, the processing engine 112 may determine the second loss function of the preliminary generative model according to formula (2) shown below:

$$J^{(G)} = -\tfrac{1}{2} E_z \log D(G(z)), \quad (2)$$

where $J^{(G)}$ may represent the second loss function of the generative model.

In step 616, the processing engine 112 may determine whether the value of the second loss function is less than a second threshold. The second threshold may be default settings (e.g., 0.5) of the on-demand service system 100, or may be adjustable under different situations. The second threshold may the same as or different with the first threshold.

In response to the determination that the second loss function is less than the second threshold, the processing engine 112 may execute the process/method to step 618 to store the preliminary generative mode.

In response to the determination that the value of the second loss function is greater than or equal to the second threshold, the processing engine 112 may execute the process/method 600 may to step 617. In step 617, the processing engine 112 may update the preliminary generative model. For example, the processing engine 112 may update the one or more generative parameters of the preliminary generative model. After the processing engine 112 updates the preliminary generative model, the processing engine 112 may execute the process/method 600 to return back to step 604 to determine an updated generative model and start a new iteration until the value of the second loss function is less than the second threshold.

In step 622, the processing engine 112 may determine a GAN model based on the (updated) generative model and the (updated) discriminative model. The processing engine 112 may further store the GAN model in a storage device disclosed elsewhere in the present disclosure.

It should be noted that the process/method 600 is an iterative process. The iterative process may include one or more iterations. During each iteration, the processing engine 112 may firstly update the discriminative model based on the first loss function and secondly update the generative model based on the second loss function. In ideal conditions, the processing engine 112 may terminate the iterative process until the first loss function and the second loss function reaches a Nashi equilibrium. As used herein, the Nashi equilibrium may refer to an equilibrium point where the set of estimated routes generated based on the generative model is almost same as the set of sample routes. In actual operation, the processing engine 112 may terminate the iterative process until both the value of the first loss function is less than the first threshold and the value of the second loss function is less than the second threshold.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a caching step) may be added elsewhere in the exemplary process and/or method 600.

Figure 7:
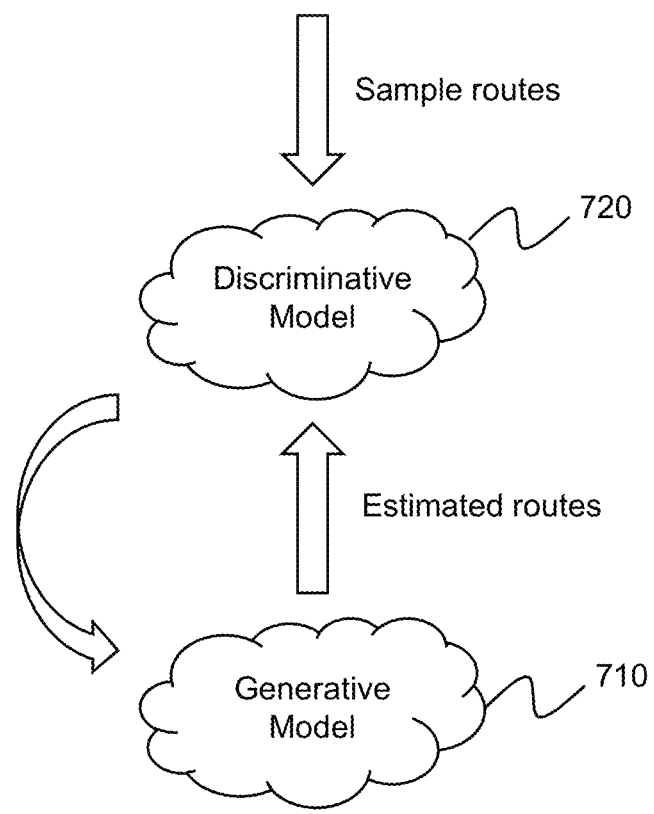
FIG. 7 is a schematic diagram illustrating an exemplary GAN model according to some embodiments of the present disclosure.

FIG. 7 is a schematic diagram illustrating an exemplary GAN model 700 according to some embodiments of the present disclosure. As illustrated in FIG. 7, the GAN model may include a generative model 710 and a discriminative model 720.

The generative model 710 may be used to generate a set of estimated routes. The generated set of estimated routes may be transmitted to the discriminative model 720 to be discriminated. The discriminative model 720 may be used to discriminate the set of sample routes and the set of estimated routes generated by the generative model 710.

The discriminative model 720 may be a binary classifier. For the discriminative model 720, the expectation value of a sample route is defined as approximately equal to "1," that is, the discriminative model 720 expects that the sample route is approximately the same as an actual route. When the expectation value of an estimated route is defined as approximately equal to "0," the discriminative model 720 expects to discriminate the estimated route as a route completely different with the sample route. For an estimated route, a probability value within a range (0, 1) may be determined based on the discriminative model 720. The probability value may be a probability which indicates how much the specific estimated close to a corresponding sample route. The larger the probability value is, the closer the estimated route may be to the corresponding sample route.

The set of sample routes and the set of estimated routes may be compared based on the discriminative model 720 and an average probability value of the set of estimated routes may be determined. The average probability value of the set of estimated routes may be transmitted to the generative model 710 and the generative model 710 may be updated accordingly. Further, an updated set of estimated routes may be generated based on the updated generative model 710 and transmitted to the discriminative model 720 to be further discriminated.

As described in connection with step 610 and step 614, the processing engine 112 may determine the first loss function of the discriminative model 720 and the second loss function of the generative model 710 based on the average expectation value of the set of sample routes, the average expectation value of the set of estimated routes, the average probability value of the set of estimated routes, etc. The processing engine 112 may determine the GAN model based on the generative model 710 and the discriminative model 720 after a plurality of iterations until the value of the first loss function is less than the first threshold and the value of the second loss function is less than the second threshold.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
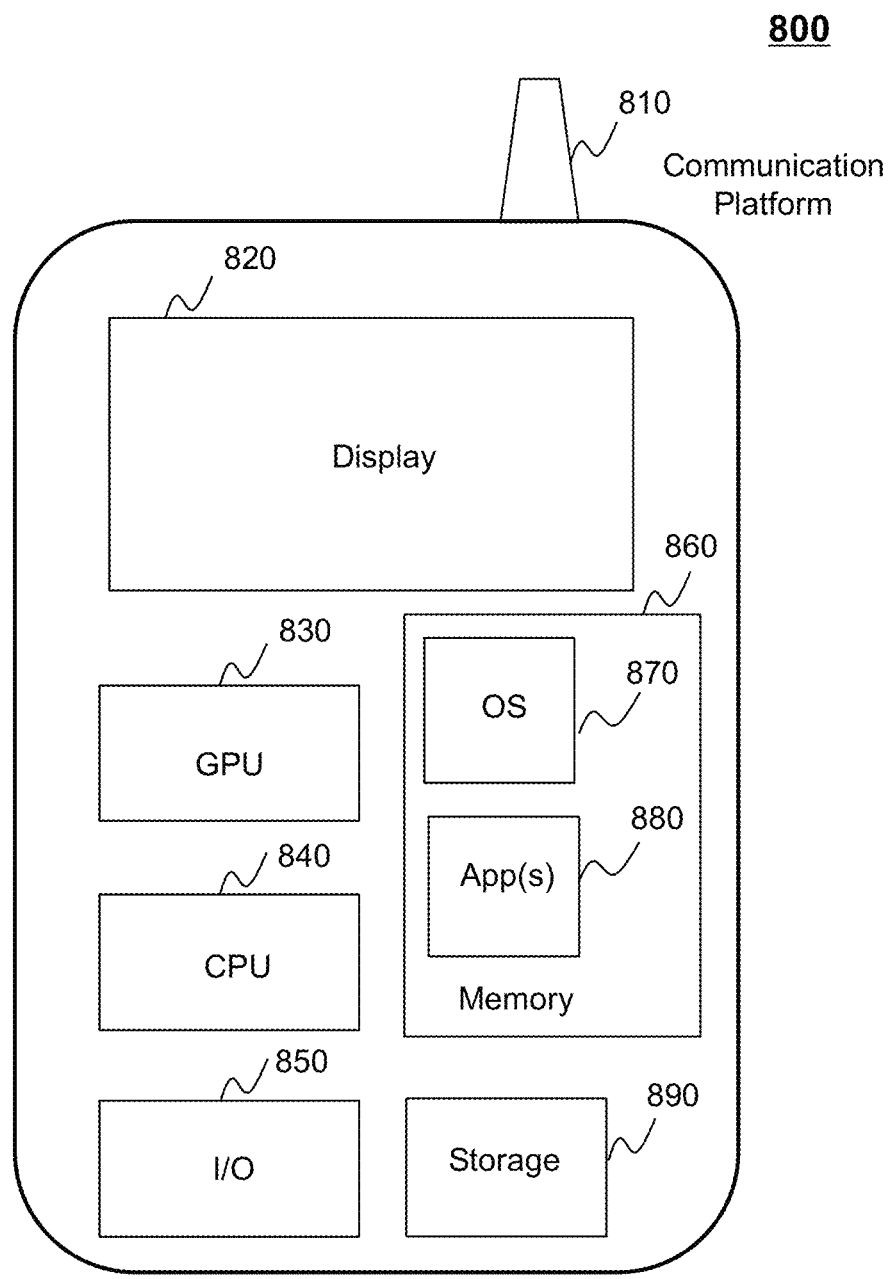
FIG. 8 is a schematic diagram illustrating exemplary hardware and/or software components of a mobile device on which the terminal may be implemented according to some embodiments of the present disclosure.

FIG. 8 is a schematic diagram illustrating exemplary hardware and/or software components of an exemplary mobile device 800 on which the requestor terminal 130 or the provider terminal 140 may be implemented according to some embodiments of the present disclosure. As illustrated in FIG. 8, the mobile device 800 may include a communication platform 810, a display 820, a graphic processing unit (GPU) 830, a central processing unit (CPU) 840, an I/O 850, a memory 860, and a storage 890. In some embodiments, any other suitable component, including but not limited to a system bus or a controller (not shown), may also be included in the mobile device 800. In some embodiments, a mobile operating system 870 (e.g., iOS™, Android™, Windows Phone™, etc.) and one or more applications 780 may be loaded into the memory 860 from the storage 890 in order to be executed by the CPU 840. The applications 880 may include a browser or any other suitable mobile apps for receiving and rendering information relating to on-demand service or other information from, for example, the processing engine 112. User interactions with the information stream may be achieved via the I/O 850 and provided to the processing engine 112 and/or other components of the on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
   at least one storage medium including a set of instructions for recommending at least one route associated with a request from a user; and
   at least one processor configured to communicate with the at least one storage medium; wherein when executing the set of instructions, the at least one processor is directed to:
   receive the request from a terminal associated with the user, the request including a departure location, a destination, and a departure time;
   determine a Generative Adversarial Network (GAN) model;
   determine at least one recommended route for the request based on the GAN model, the departure location, the destination and the departure time, wherein the at least one recommended route travels from the departure location to the destination; and
   transmit the at least one recommended route to be displayed on the terminal in response to the request.

2. The system of claim 1, wherein to determine the GAN model, the at least one processor is further directed to:
   obtain a set of sample routes;
   generate a generative model;
   determine a set of estimated routes based on the generative model;
   generate a discriminative model;
   determine a first loss function of the discriminative model based on the set of sample routes and the set of estimated routes;
   determine whether the value of the first loss function is less than a first threshold; and
   store the discriminative model based on the determination that the value of the first loss function is less than the first threshold.

3. The system of claim 2, wherein to determine the GAN model, the at least one processor is further directed to:
   update the discriminative model based on the determination that the value of the first loss function is not less than the first threshold.

4. The system of claim 2, wherein to determine the GAN model, the at least one processor is further directed to:
   determine a second loss function of the generative model based on the set of sample routes and the set of estimated routes;
   determine whether the value of the second loss function is less than a second threshold; and
   store the generative model based on the determination that the value of the second loss function is less than the second threshold.

5. The system of claim 4, wherein to determine the GAN model, the at least one processor is further directed to:
   update the generative model based on the determination that the value of the second loss function is not less than the second threshold.

6. The system of claim 4, wherein to determine the GAN model, the at least one processor is further directed to:
   determine the GAN model based on the discriminative model and the generative model.

7. The system of claim 2, wherein each of the set of sample routes includes at least one of:
   a sample departure location,
   a sample destination,
   link information between the sample departure location and the sample destination,
   a sample departure time,
   a sample arrival time, or
   traffic information associated with the each of the set of sample routes.

8. The system of claim 2, wherein the generative model is one of a Convolutional Neural Network model or a Recurrent Neural Network model.

9. The system of claim 2, wherein the discriminative model is one of a Convolutional Neural Network model or a Recurrent Neural Network model.

10. The system of claim 2, wherein the number of the set of sample routes is 256, 512, or 1024.

11. A method, comprising:
receiving, by a processor, a request from a terminal associated with a user, the request including a departure location, a destination, and a departure time;
determining, by the processor, a Generative Adversarial Network (GAN) model;
determining, by the processor, at least one recommended route for the request based on the GAN model, the departure location, the destination and the departure time, wherein the at least one recommended route travels from the departure location to the destination; and
transmitting, by the processor, the at least one recommended route to be displayed on the terminal in response to the request.

12. The method of claim 11, wherein the determining the GAN model comprises:
obtaining a set of sample routes;
generating a generative model;
determining a set of estimated routes based on the generative model;
generating a discriminative model;
determining a first loss function of the discriminative model based on the set of sample routes and the set of estimated routes;
determining whether the value of the first loss function is less than a first threshold; and
storing the discriminative model based on the determination that the value of the first loss function is less than the first threshold.

13. The method of claim 12, wherein the determining the GAN model comprises:
updating the discriminative model based on the determination that the value of the first loss function is not less than the first threshold.

14. The method of claim 12, wherein the determining the GAN model comprises:
determining a second loss function of the generative model based on the set of sample routes and the set of estimated routes;
determining whether the value of the second loss function is less than a second threshold; and
storing the generative model based on the determination that the value of the second loss function is less than the second threshold.

15. The method of claim 14, wherein the determining the GAN model comprises:
updating the generative model based on the determination that the value of the second loss function is not less than the second threshold.

16. The method of claim 14, wherein the determining the GAN model, comprises:
determining the GAN model based on the discriminative model and the generative model.

17. The method of claim 12, wherein each of the set of sample routes includes at least one of:
a sample departure location,
a sample destination,
link information between the sample departure location and the sample destination,
a sample departure time,
a sample arrival time, or
traffic information associated with the each of the set of sample routes.

18. The method of claim 12, wherein the generative model is one of a Convolutional Neural Network model or a Recurrent Neural Network model.

19. The method of claim 12, wherein the discriminative model is one of a Convolutional Neural Network model or a Recurrent Neural Network model.

20. The method of claim 12, wherein the number of the set of sample routes is 256, 512, or 1024.

21. A non-transitory computer readable medium comprising executable instructions that, when executed by at least one processor, cause the at least one processor to effectuate a method comprising:
receiving a request from a terminal associated with a user, the request including a departure location, a destination, and a departure time;
determining a Generative Adversarial Network (GAN) model;
determining at least one recommended route for the request based on the GAN model, the departure location, the destination and the departure time, wherein the at least one recommended route travels from the departure location to the destination; and
transmitting the at least one recommended route to be displayed on the terminal in response to the request.

* * * * *